UNITED STATES PATENT OFFICE.

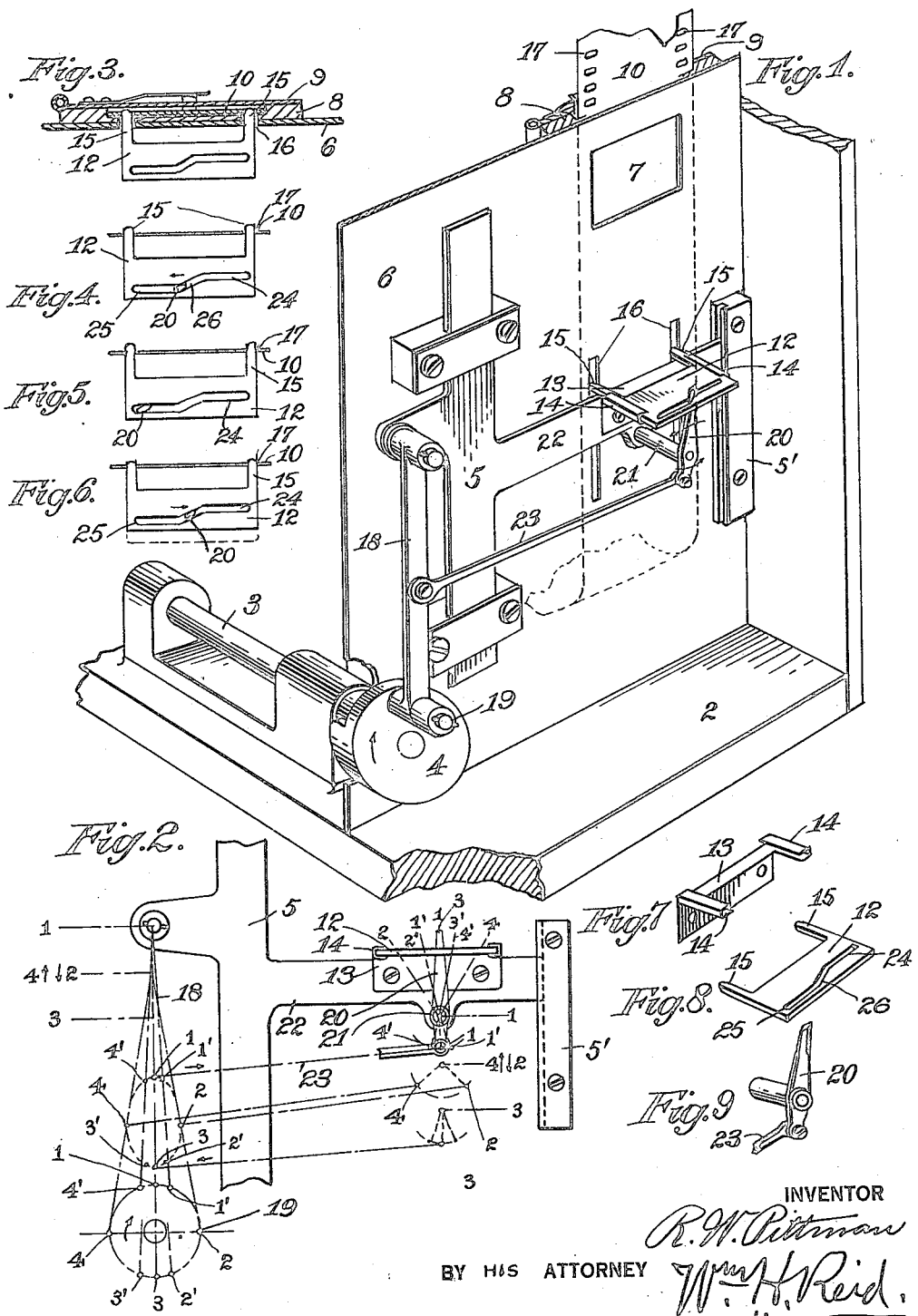

REINHART W. PITTMAN, OF NEW YORK, N. Y.

FILM FEED FOR MOTION-PICTURE MACHINES.

1,403,106.     Specification of Letters Patent.     Patented Jan. 10, 1922.

Application filed March 8, 1921. Serial No. 450,705.

*To all whom it may concern:*

Be it known that I, REINHART W. PITTMAN, a citizen of the United States of America, and a resident of New York city, in the county of New York and State of New York, have invented certain new and useful Improvements in Film Feed for Motion-Picture Machines, of which the following is a full, clear, and exact description.

This invention relates to mechanism for intermittently feeding a film to its place of exposure, and is especially designed for use in motion picture cameras.

The object of this invention is to provide an improved means for engaging the perforated margins of a film by means of arms movably carried by a slide, whereby the arms are rapidly advanced across the carrier at one limit of its movement to enter the firm perforations; and which arms remain engaging the film until the end of the advance movement of the carrier, and are thereupon quickly withdrawn.

In the accompanying drawing showing one embodiment of my invention, Figure 1 is a perspective view of the mechanism showing adjacent portions of the camera.

Fig. 2 shows carrier and connected parts, indicating successive positions.

Fig. 3 is a sectional view through the carrier.

Figs. 4, 5 and 6 show the slide with the lever in different positions in its slot.

Fig. 7 shows the guide for the slide on the carrier.

Fig. 8 shows the slide separately.

Fig. 9 shows the lever that is mounted on the carrier.

As shown in the drawing, the camera 2 is provided with an operating shaft 3 having a crank 4 fast thereon. A carrier 5 is suitably guided to reciprocate on a supporting plate 6 having a window 7 at which the film is exposed. On this vertical plate 6 the usual run way 8 and tension door 9 are arranged to form a passage-way for the film 10, that will register with the window 7, see Figs. 1 and 3. The carrier 5 has a slide 12, movable thereon in a path transverse to the path of the carrier, see Fig. 8. A guide strip 13 is shown, see Fig. 7, having channel portions 14, 14, in which the slide 12 moves across the carrier 5, whereby the arms 15, 15, on the slide, will be caused to project through slots 16, 16, in plate 6 and enter the passage-way for the film. These arms will engage the perforations 17 in the film margins, and when the slide moves downwardly, will advance the film an image length, then withdraw, and the slide will return to former position but not move the film.

Carrier 5 is caused to reciprocate by the crank 4 by means of connecting rod 18, pivoted at one end to the carrier, and at its other end to the crank pin 19. The means that reciprocate the carrier also serve to intermittently reciprocate the slide 12. A lever 20 is supported on the post 21 fast to the carrier arm 22, and connected by one end with connecting rod 18 by a link 23. The slide 12 is provided with a slot having a straight portion 24 that is at right angles to the direction of movement of the slide on the carrier, and a straight portion 25 parallel with the portion 24 but offset therefrom, see Fig. 4. These straight portions are connected by an inclined connecting portion 26 and this entire slot is traversed by the end of the lever 20.

In the rotation of the crank 4, as indicated by the diagram in Fig. 2, when the crank pin 19 travels from the point 2 around to the point 4, making a half revolution, the connecting rod at its attachment with link 23 will shift the link end from the point 2, around to the point 4, as indicated by the ellipse in this view. This movement will swing the lever end first through the straight slot portion 25, that will not move the slide 12, then through the cam portion 26, that will move the slide rearward away from the film, and then the lever will move through the straight portion 24, that will not shift the slide but hold is retracted. It will be understood that during the other half revolution of the crank, that moves the crank pin from point 4 around to point 2, the link 23 where. attached to the connecting rod will move through the ellipse from point 4 around to point 2. This will swing the end of lever 20 in the opposite direction through the slot in the slide 12; first moving through the straight portion 24, then through the cam portion 26, and then through the straight portion 25. This movement of the lever through the cam portion 26, will move the slide inward and cause the arms 15 to enter the film perforations.

From this it will be further understood that when the crank pin moves from the point 4' across to the point 1', the carrier will be at its uppermost position and not shifted; but during this movement the end of lever 20 is swung by the link to move through the cam portion 26 of the slot, that will shift the slide and cause the arms to enter the film. From the point 1' around to the point 2', the carrier will move downwardly and advance the now-engaged film. From point 2' across to the point 3' of the crank pin movement the lever will be swung by the link to move through the cam portion of the slot and will retract the slide, and the arms will leave the film perforations. During this movement of the crank pin, the carrier will be practically at rest in its lowermost position. It will thus be understood that when the slide is moving up or down the lever is engaging the straight portion of the slot in the slide, and the slide is held stationary; and when the slide is advanced or retracted by the lever, the carrier is practically at rest. Thus the slide arms enter the film perforations at the uppermost position of the carrier when at rest, and remain engaging the film until the carrier moves down to its lowermost position, when the arms are retracted from the film and remain free of the film during the return of the carrier.

When the crank shaft 3 is rotated in the opposite direction to that as set forth, the film will be reversed and intermittently fed backward or upward. The arms of the slide 12 then enter the film perforations at the lower part of the carrier movement, and remain in the film until the carrier moves upward, and are withdrawn at the top. This mechanism is operative in either direction of film travel. In cameras of this character it is often necessary to reverse the film to produce the double exposure, and similar effects.

What I claim is:—

1. In a mechanical movement, a carrier mounted to reciprocate, a crank, a link connecting the crank and carrier to reciprocate the carrier, a slide movable on the carrier transverse to the carrier path of movement, a lever pivoted on the carrier, a rod connecting the lever and said link, arranged to rock the lever, said slide and lever having a cam connection, arranged whereby the lever will shift the slide only at the end portions of the carrier movement and which connection beyond said two places will hold the slide against movement by the said rod.

2. In a mechanical movement, a carrier mounted to reciprocate, a crank, a link connecting the crank and carrier to reciprocate the carrier, a slide movable on the carrier transverse to the carrier path of movement, a lever pivoted on the carrier, a rod connecting the lever and said link, arranged to rock the lever, said slide having a slotted wall with a cam portion engaging said lever that will shift the slide only at the end portions of the carrier movement and which slot walls beyond the cam part will hold the slide against movement by the said rod.

3. In a mechanical movement, a carrier mounted to reciprocate, means to reciprocate the carrier, a slide movable on the carrier transverse to the carrier path of movement, a lever pivoted on the carrier, a rod connecting the lever and reciprocating means to rock the lever, said slide having a slotted wall with a cam portion engaging said lever that will shift the slide only at the end portions of the carrier movement and which slot walls beyond the cam part will hold the slide against movement by the said rod.

4. In a mechanical movement, a carrier mounted to reciprocate, means to reciprocate the carrier, a slide movable on the carrier transverse to the carrier path of movement, a lever pivoted on the carrier, a rod connecting the lever and reciprocating means to rock the lever, said slide and lever having a cam connection arranged whereby the lever will shift the slide only at the end portions of the carrier movement and which connection beyond said two places will hold the slide against movement by the said rod.

Signed at New York city, March 7th, 1921.

REINHART W. PITTMAN.